United States Patent [19]
Lemelson

[11] Patent Number: 4,471,343
[45] Date of Patent: Sep. 11, 1984

[54] ELECTRONIC DETECTION SYSTEMS AND METHODS

[76] Inventor: Jerome H. Lemelson, 85 Rector St., Metuchen, N.J. 08840

[21] Appl. No.: 298,826

[22] Filed: Sep. 2, 1981

Related U.S. Application Data

[63] Continuation of Ser. No. 858,669, Dec. 27, 1977, abandoned, which is a continuation-in-part of Ser. No. 849,785, Nov. 9, 1977, Pat. No. 4,189,712.

[51] Int. Cl.³ .................... G08B 13/14; B60R 25/04

[52] U.S. Cl. .................... 340/571; 340/64; 340/542; 340/825.31; 307/10 AT; 361/171

[58] Field of Search .................... 340/571, 572, 63, 64, 340/65, 505, 542, 543, 539, 825.31, 825.34, 825.54, 825.69, 825.72; 307/10 AT, 10 R; 361/171, 172; 455/26, 352; 343/6.5 R, 6.8 R

[56] References Cited

U.S. PATENT DOCUMENTS

| | | | |
|---|---|---|---|
| 2,774,060 | 12/1956 | Thompson | 340/572 |
| 3,659,154 | 4/1970 | Finn | 340/543 |
| 3,694,803 | 9/1972 | Strenglein | 340/58 |
| 3,732,555 | 5/1973 | Strenglein | 340/63 |
| 3,803,551 | 4/1974 | Jordan | 340/64 |
| 3,866,168 | 2/1975 | McGuirk | 340/63 |
| 3,891,980 | 6/1975 | Lewis et al. | 340/572 |
| 3,938,044 | 2/1976 | Lichtblau | 340/572 |
| 3,987,408 | 10/1976 | Sassover et al. | 340/64 |
| 4,016,553 | 4/1977 | Novikoff et al. | 340/572 |
| 4,080,594 | 3/1978 | Plevy | 340/542 |
| 4,106,006 | 8/1978 | Atkins | 340/542 |

*Primary Examiner*—Donnie L. Crosland
*Attorney, Agent, or Firm*—Neil F. Markva

[57] ABSTRACT

Electronic detection systems and methods are provided for detecting the unauthorized passage of a person or object past a checkpoint defined, for example, by a doorway to a room or building, an entrance or exit gate for a piece of property, a post or pole supporting the detection equipment or hidden detection means. The detection system includes one or more alarms which operate either in the vicinity of the unauthorized object or person detected and/or remote therefrom such as a central monitor station for monitoring a plurality of checkpoint locations. An alarm deactivating device is employed which may be carried by a person or object and which either generates a code or deactivating signal and broadcasts same to a receiver located at the checkpoint or predeterminately affects or alters a radiation field generated in the vicinity of the checkpoint which code, signal or field change is detected and employed to deactivate and alarm or other circuit.

16 Claims, 4 Drawing Figures

ELECTRONIC DETECTION SYSTEMS AND METHODS

RELATED APPLICATIONS

Figure 1:
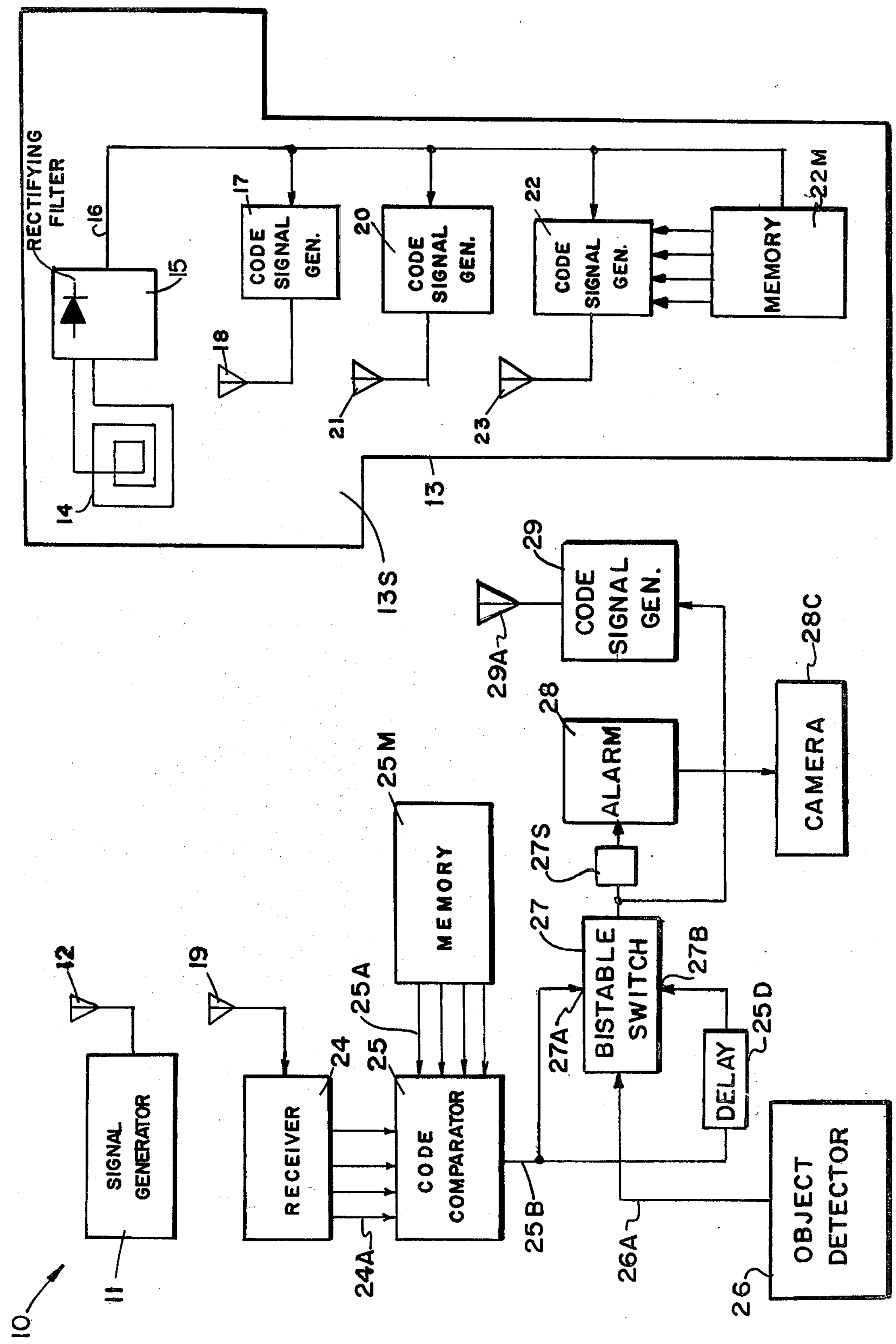

This is a continuation of application Ser. No. 858,669, now abandoned, filed Dec. 27, 1977, which is a continuation-in-part of application Ser. No. 849,785 now U.S. Pat. No. 4,189,712 entitled Switch and Lock Activating System and Method filed on Nov. 9, 1977.

SUMMARY OF THE INVENTION

This invention relates to systems and methods for detecting the movement of unauthorized persons and/or object such as pilfered or stolen goods and articles past a detection station or checkpoint. The invention is particularly concerned with electronic means for detecting theft and/or illegal or unauthorized movement of persons, vehicles or other objects past a checkpoint or detection location wherein a detector or alarm circuit may be deactivated if a simple electronic circuit formed on or added to a simple portable card, chip or other device is carried by the object and/or a person carrying same past the checkpoint.

In one form, articles to be protected or persons authorized to enter a premise, room, piece of property or vehicle carry or contain hidden therein a passive electronic circuit formed of or supported on a card or chip, which circuit is activated by radio frequency energy generated and transmitted in the vicinity of the checkpoint either continuously or in response to the closure of a switch upon detecting or otherwise being activated by a person or object moved into the vicinity of the checkpoint. While not shown in the drawings, the alarm deactivating electronic circuit may also be powered by its own battery carried by the device and/or person or object carrying same past the checkpoint. If radiant energy is generated at the checkpoint for either activating the code generating devices employed to deactivate the alarm at the checkpoint or remote therefrom or such radiant energy is employed to otherwise detect the presence of an object or person not containing a deactivating electronic circuit as described herein, such radiant energy may be constantly generated at and in the vicinity of the checkpoint or generated upon detection of any object or person moving past or in the vicinity of the checkpoint or upon the movement of any object within a given spatial volume such as a building, room or other area to be so protected against theft or unauthorized body movement.

Accordingly it is a primary object of this invention to provide a new and improved apparatus and method for detecting the unauthorized movement of an object within a given spatial volume or past a checkpoint.

Another object is to provide a system and method for detecting the theft of an article or the unauthorized removal thereof from a premise, business or home property.

Another object is to provide a system and method for protecting personal possessions from theft or removal from a home or the vicinity of a person and to provide such person or home owner with immediate indication of such removal or theft.

Another object is to provide a detection system for articles containing automatic identifying means, such as a code generator or other means wherein neutralizing means for the detection function or an alarm operated upon effecting such detection is provided to be carried by a person owning or possessing the article or authorized to carry same so as to prevent such alarm from being operated when the detection means detects the presence of the article or a code generating means secured thereto.

Another object is to provide a system for automatically detecting when selected articles are in the vicinity of a scanning means and control means activated by the detection means for effecting a recording of the image of the object upon such detection.

Another object is to provide a system for automatically detecting pilfered articles as they are carried by a person or in a vehicle and alerting personnel of such act or condition.

Another object is to provide a system for detecting the movement of an article past a checkpoint and for detecting unauthorized movement or theft of certain articles wherein the detection electronics is simple and low in cost and may easily be mass produced.

With the above and such other objects in view as may hereinafter more fully appear, the invention consists of the novel apparatus and methods, combinations and arrangements of parts as will be more fully described and illustrated in the accompanying drawings, but it is to be understood that changes, variations and modifications may be resorted to which fall within the scope of the invention as claimed.

In the drawings:

FIG. 1 is a schematic diagram of an alarm indicating or enabling electronic system employing a simple card or chip containing a code generating means for deactivating the alarm or enabling the operation of a control when the code and an object is detected.

Figure 2:
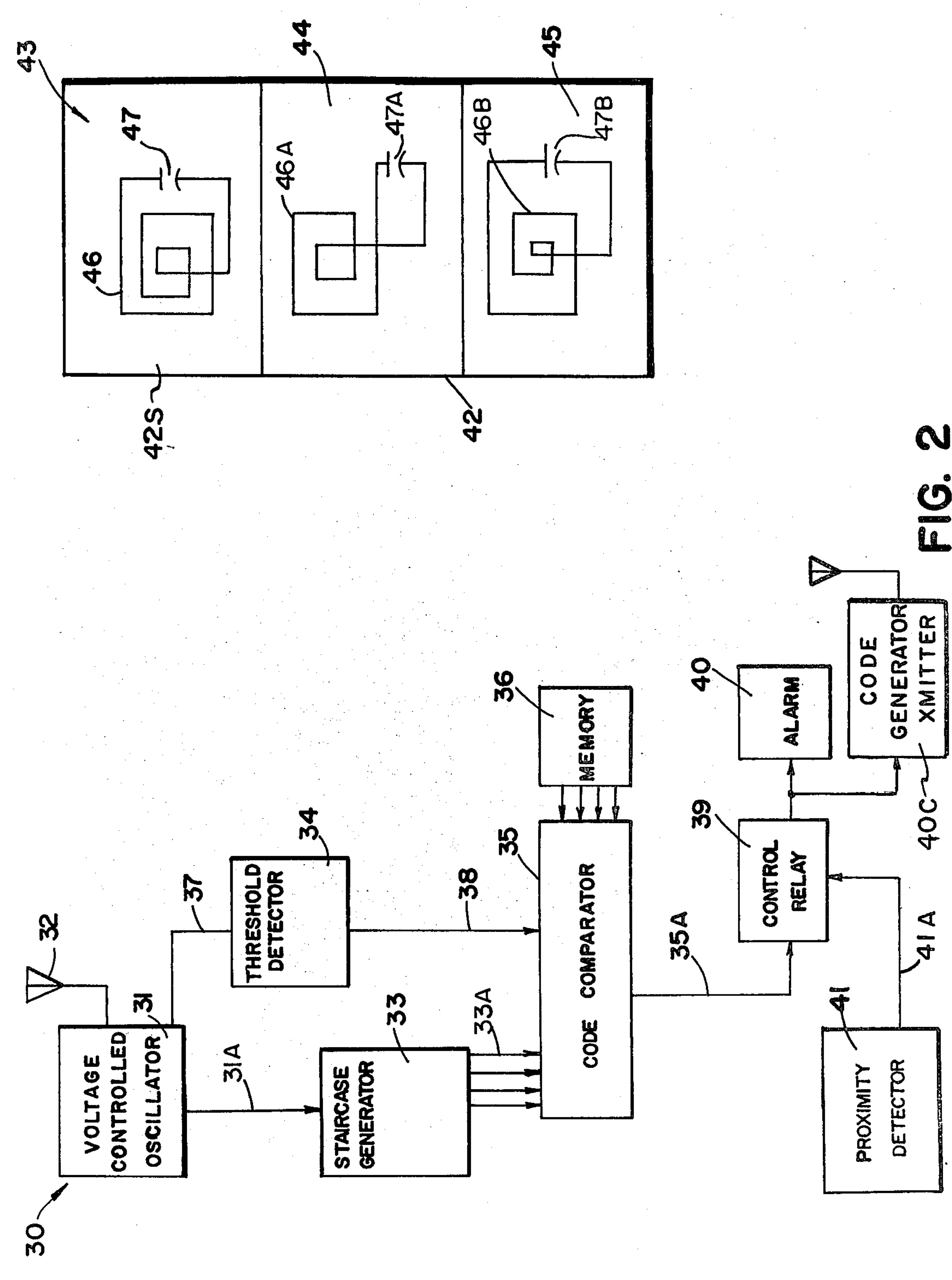
Figure 3:
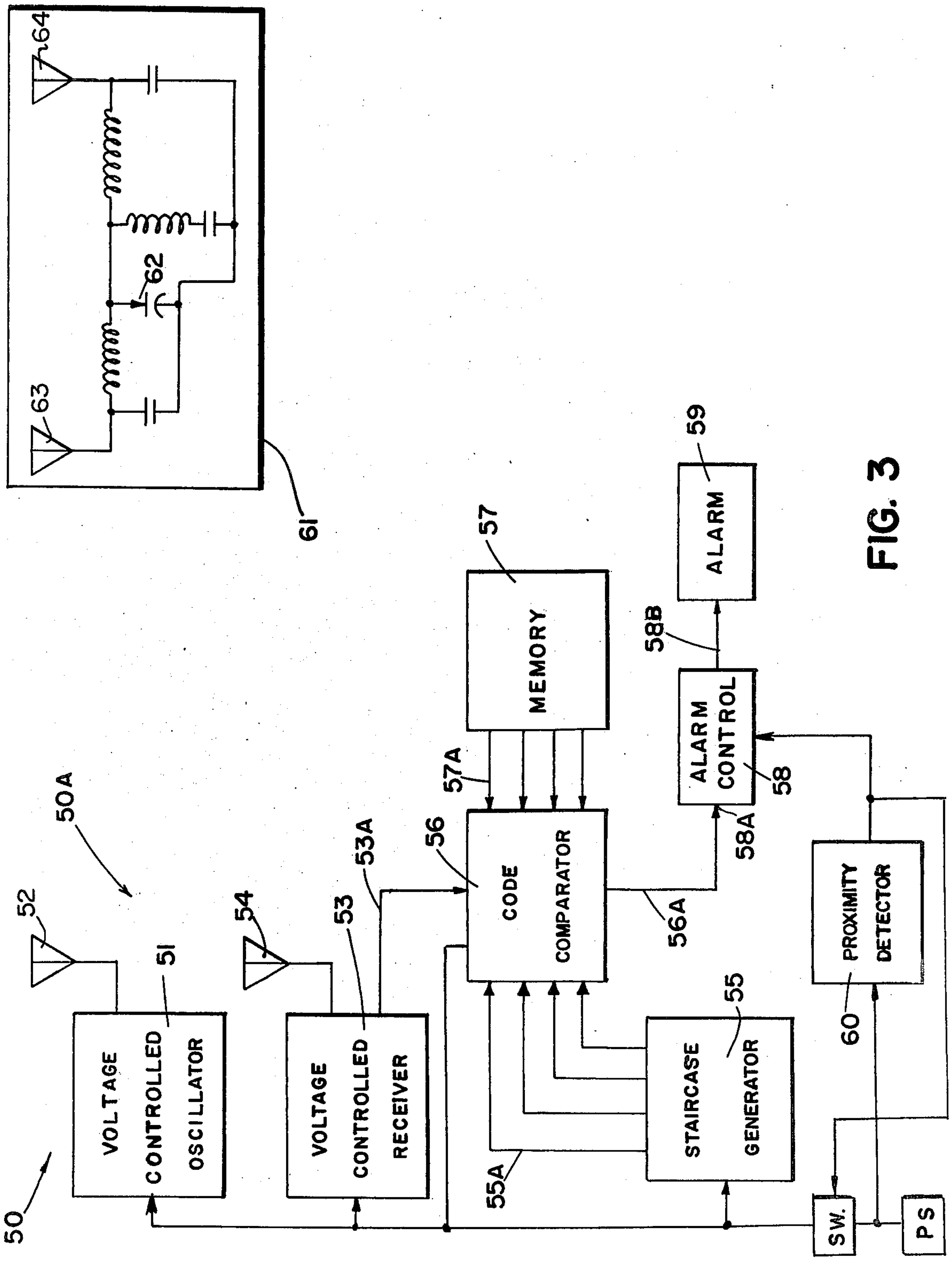
Figure 4:
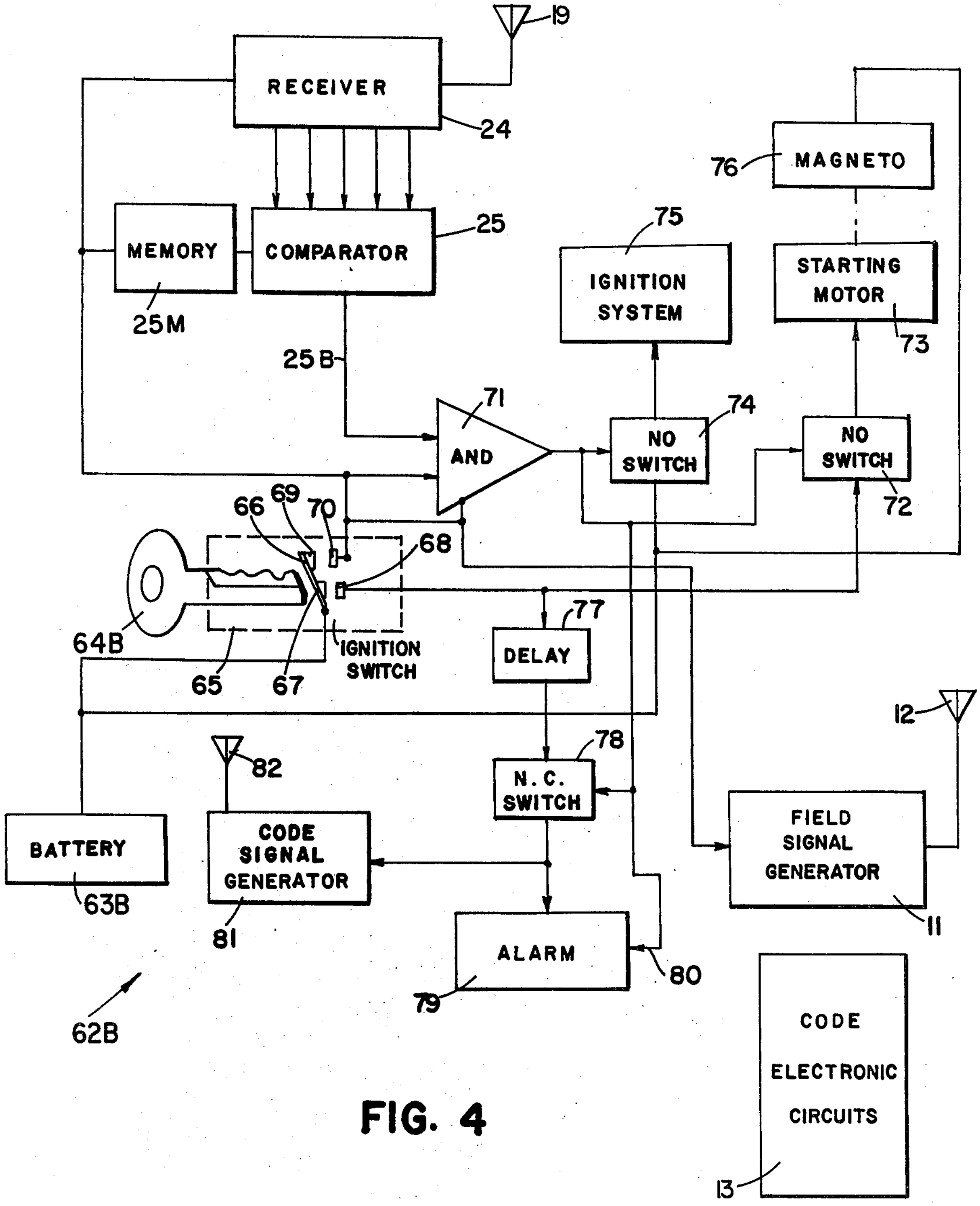

FIG. 2 is a schematic diagram of a modified form of the system of FIG. 1 employing selective absorption of short wave energy, FIG. 3 is a schematic diagram of another modified form of the invention wherein frequency multiplication is employed for detection, and FIG. 4 is a schematic diagram of another modified form of the invention employing both a manually operated key and an electronic circuit for activating a switching means such as an ignition switch for an automobile.

ACTIVE, CODED SIGNAL RE-TRANSMISSION ALARM OR ENABLING SYSTEM

FIG. 1 illustrates an electronic system 10 which may be utilized as an automatic theft alarm system responding, for example, to the unauthorized movement of an article past a check point or detection station, such as a doorway of a home, store, office building, factory, warehouse, garage or a building of a military installation past which a person may walk in carring the article. The check point or detection station, which supports a detection circuit to be described, may also comprise a location adjacent to or within a roadway, such as a road leading into or through restricted property or grounds, the entrance to a garage, factory or warehouse, or a public throughfare running adjacent to a building from which goods or articles may be stolen or removed without authorization.

The system 10 includes a signal generator 11 which is operable to generate a radiation field such as short wave radiation, microwave radiation or other form of electromagnetic radiation which is transmitted from an antenna or transducer 12. Radiation from the field so generated by the radiation field generator 11 is received or picked up by a receiving antenna or transducer 14 forming part of a device 13 which may comprise a microminiature electronic circuit in the form of a chip, a sheet of paper or plastic or a card held by or laminated between layers defining an identification card such as a credit card or other form of card defined primarily by a sheet-like substrate 13S.

Energy from the field generated by signal generator 11 and received by antenna 14 is rectified and filtered by means of a suitable rectifying-filter circuit 15 so as to provide a D.C. voltage for the power bus 16 of the circuit or device 13 whenever the latter is operably within the range of radiation field transmitter 11. Power has 16 supplies operational current to the remaining electronic elements of the active device or electronic circuits mounted or formed directly on the substrate 13S. Energizing electrical energy may also be supplied by means of a flat strip battery or other form of battery supported on or laminated within the flat substrate or card 13S or from a small battery connected to the circuits thereof.

When D.C. electrical energy is generated on bus 16, it serves to activate one or more signal generators each operable when so energized to generate one or more signals of a specific frequency or tone on its output which is connected to an antenna. Three separate tone signal generators are shown formed on substrate 13S denoted 17,20 and 22, each of which has its output connected to a respective antenna denoted 18,21 and 23. Signal generator 17 may be operable to generate a single frequency signal. Signal generator 20 may generate an output signal at two frequencies while signal generator 22 is shown having a memory 22M having a plurality of outputs connected thereto for causing the generator to generate four or more tones or frequency signals defining a code when transmitted to an alarm deactivating means to be described. Any or all of the code signal generators may be provided on the substrate 13S to be simulatenously energized and provide a complex output code or a simple code or tone when the bus 16 is energized with suitable current generated on the output of filter 15 or by a battery connected to bus 16. One or more multiple pole switches may be provided in the bus 16 to be manually closed and opened for selectively generating different codes or tones in accordance with signalling requirements at different checkpoints or security locations or in the event that security requires that the code generated be altered or changed. Similarly, by punching holes in or scrapping selected portions of the substrate containing selected portions of the bus 16 one or more of the code signal generators may be permanently deactivated by breaking bus connection thereto.

An antenna 19 forms part of detection circuits associated with the check point or detection station electronics which includes a receiver circuit 24 connected to receive the code signals radiated by the antenna or antennas of the electronic circuits of the card or other form of portable device 13. The parallel code defined by the different frequency signals generated by the circuits of device 13 is generated as a parallel binary code on the plural outputs 24A of receiver 24 which extend to a code comparator 25 having parallel inputs 25A thereto from a memory 25M such as a microprocessor containing all of the authorized codes, if the system employs a plurality of devices such as code generating device 13 which are adapted to generate different codes when activated as described. If the code presented to comparator 25 by receiver 24 matches the code or one of the codes presented thereto by memory 25M, a control signal will be generated on an output 25B which may be employed to open a normally closed switch or a bistable switch 27 to prevent a detection signal from passing through said switch to an alarm 28. Such signal may be generated by an object detector 26 which may comprise a proximity detector of any suitable type for detecting movement of the object or a person carrying the object past the checkpoint or detection station. The detector 25, which has an output 26A connected to the input of switch 27 may vary from a simple limit switch or series of switches located in a mat across which the object or a person may move to an ultrasonic detection circuit located within a room or at the checkpoint for detecting any movement therein or the movement of certain objects such as objects of a certain minimum size, perhaps larger than a human being if it is not desired to detect the general movement of persons past the checkpoint who may not be carrying or removing the object from its stored site. However, if it is desired to detect and warn of all movement past the checkpoint or within a given volume or room and to provide a warning if such movement is not by an authorized person (e.g. one not carrying an electronic card or device 13 on his person) then the detector 26 may comprise a conventional ultrasonic alarm system, a photoelectric detection system, an electrical capacitance or magnetic detection means, a radar detection means or a sensor of radiation of a device hidden within an object to be protected from theft, such as a device similar to device 13 or other suitable signal or code generator such as one of the types described hereafter. The detector, for example, may comprise a magnetic field detection circuit as disclosed in U.S. Pat. No. 3,919,704 or any suitable means for generating a signal for activating alarm 28 upon detecting any movement within a given volume or past the checkpoint at which generator 11 and receiver 24 are located provided that device 13 is not in the vicinity thereof.

Alarm device 28 may be any suitable device employed to indicate unauthorized movement, such as a bell, sirene, buzzer, lamp, etc. An output is shown extending from alarm 28 or from the output of switch 27 to the control for a camera 28C such as a photographic camera or television camera adapted, when activated by the signal passed through switch 27 or the activation of alarm 28, to take a picture of the object or person in the vicinity of the checkpoint station or of the room or area being so protected or to generate a television signal of the area scanned by the TV camera which signal may be automatically recorded in a magnetic recorder subh as a videotape recorder.

The output of code comparator 25 is first passed to a first input 27A of switch 27 opening same and is also applied to a time delay relay 25D, which after a specific time delay, closes switch 27 by activating a switching input 27B thereof, a function which serves to automatically reset the detection-alarm system to permit it to function properly for future detection operations. A manually operated or remote controlled switch 27S is shown in the output of switch 27 to permit the alarm 28 to be selectively deactivated if desired. The output of switch 27 is also shown connected to a code signal generator 29 which transmits a code via short wave on antenna 29A to a remote location indicating activation of the alarm and the location of the checkpoint at which theft detection or unauthorized movement is detected.

SELECTIVE OSCILLATOR SIGNAL ABSORPTION THEFT ALARM SYSTEM

FIG. 2 illustrates an electronic detection system 30 which operates by means of the selective absorption of transmitted short wave signals by a passive device which is operable to sense a specific code or tonal array. The system 30 may be utilized to automatically/sense authorized or unauthorized movement of an article, container of articles, vehicle, machine or any device to which is attached or hidden therein an appropriately coded electronic circuit such as formed on a card, microminiature circuit chip or on a component of the device to be detected. In a particular form, the chip or card may be secured or embedded within a component of the device such as a wall or other part of the device, during the formation or fabrication of the component of the device. For example, a passive electronic circuit or chip of the type which will be described may be disposed within a plastic molding, casting or other material forming part of the device to be protected, such as a wall thereof or other component.

In FIG. 2, specific tone or frequency signals are generated by a voltage controlled oscillator 31 and are transmitted on an antenna 32 which is located, for example, in a room containing articles or property to be protected, at a check point such as within or adjacent to a doorway, a post, a machine, a wall, curbing, floor, roadway or other structure, preferably containing such oscillator and antenna hidden from view. The oscillator 31 may be operable at all times to detect the movement or removal of suitably tagged articles, vehicles or personnel past the check point or it may be energized upon detection of movement in general past the check point such as by the operation of a limit switch, photoelectric detector or other form of proximity detector. The frequency of oscillator 31 is determined by the voltage supplied by a staircase generator 33 which operates to provide a repeating series of discrete oscillator frequency signals.

The system 30 includes one or more electronic circuit devices 42, preferably in the form of microminiature circuits formed on small ceramic chips or flat circuit elements printed or otherwise formed on cards or strips of suitable substrate material. The device 42 is a code generating device which contains one or more circuits, three of which are illustrated and denoted 43, 44, and 45. Each of the circuits 43, 44, and 45 contains an antenna which is formed and tuned to a different frequency than the antennas of the other circuits. Circuit 43 being typical consists of an antenna or coil 46 which is self-resonant at a particular frequency in combination with a capacitance 47. When such a tuned circuit enters a field of the same frequency, it absorbs some of the radiated energy of the field and such absorption is reflected back to the oscillator (e.g., oscillator 31) as an additional load which changes the current characteristics of the oscillator's active device (e.g., the grid current of a tube if used to form the oscillator or the source current of a field effect transistor if the oscillator is formed of solid state devices such as transistors).

The circuits which are associated with the antenna 32 include a threshhold detector 34 which receives signals from the voltage controlled oscillator 31 on an output 37 extending from the oscillator to the input of the detector 34. The threshold detector thus is able to sense the current flow change present at the oscillator 31 as a result, for example, of the loading caused thereby from the appropriate resonant circuit of the device 42 when it comes within the field of the antenna 32. The output 38 of threshold detector 34 extends to an electronic comparator circuit 35 and a signal generated on the output circuit 38 may be applied as an energising or enabling signal for code comparator 35.

The staircase generator 33 provides a coded output which corresponds to each voltage step in its waveform (corresponding to a specific frequency of the voltage controlled oscillator 31) to the code comparator 35). The comparator, upon receipt of an enabling signal from threshold detector 34, compares the code generated by the staircase generator 33 with the code generated on the parallel outputs 36A of a memory device 36 such as a microminature electronic parallel code generating circuit. If the code generated by staircase generator 33 matches that generated by memory code generating device 36, a control signal will be generated by the comparator 35 on its output 35A which may be applied to a relay or other form of control 39 for activating or deactiving an alarm 40.

The particular manner in which the alarm 40 is enabled, energized or deenergized by the activation or deactivation of the relay or control 39 will depend on what the system is desired to detect. For example, if the device 42 is intended to deactivate an alarm when it comes within the field of the antenna 32, switch or relay 39 will be operable to prevent alarm 40 from being energized when, for example, a circuit associated with said alarm, a sensor 41 detects the movement of an article, person, vehicle or other machine past a check point. If the device 42 is not within operable range of 31 or not carried by the article, machine or other device and sensor 41 is adapted to detect the movement of such article past the check point, the activation of relay 39 may be operable to cause the alarm 40 to become active and generate a noise, turn on a light and/or transmit, for example, a warning signal to a remote location such as a monitor station. Notation 40C refers to a code generating and short wave transmitting circuit activated when the output of device 42 becomes activated to generate and transmit a such a warning signal or code to a remote receiver for activating an alarm thereat, effecting a recording of the code, operating a camera, etc.

In FIG. 2 circuits 44 and 45 respectively include antennas 46A and 46B and capacitances 47A and 47B which function as described above with respect to circuit 43. Circuits 43,44 and 45 may be supported by a flat sheet, disc, card or chip defining a substrate 52S carried by the object, person or vehicle carrying same past the check point or detection station.

Two modes of operation are noted for the system of FIG. 2. One, described above, involves the use of device 42 to effect the opening of a normally closed switch (e.g. switch 39) so as to prevent alarm 40 from becoming activated when detector 41 generates a signal upon detecting the object or article to be protected, when said object is in the vicinity of the detector or moving past the checkpoint or detection station. In a second mode of operation or embodiment of the system of FIG. 2, device 42 may be carried by or hidden within the object moved past the check point and the signal generated on the output 35A of comparator 35 may be passed through a normally closed switch (e.g. 39) unless said switch is opened by a signal from detector 41 when the latter is activated upon detecting the presence of another device similar to device 42 which is carried by the person or vehicle carrying the object past the check point. In this case detector 41 would be similar in structure to those components of FIG. 2 which include voltage controlled oscillator 31 and code comparator 35 having a differently coded memory for detecting the presence of said modified version of device 42. The signal generated on the output 41A of detector 41 in this case would be applied to open the normally closed switch 39 to prevent operation of the alarm 40 when the modified device 42 is present and detected by detector 41.

In the first embodiment mentioned above, device 41 may comprise a proximity detector such as a mat contained limit switch, a photoelectric detector, ultrasonic wave sensor detecting variations in a sound field by object movement in a room or past a checkpoint or other form of object movement detection means.

FREQUENCY MULTIPLICATION THEFT ALARM SYSTEM

FIG. 3 illustrates another embodiment of the invention defining an electronic frequency multiplication theft alarm system 50 in which a portable coded device, such as a chip, card or other thin circuit element, or a plurality of such devices, contain frequency multiplier circuits which are responsive to a specific transmitted frequency and which retransmit the received signal at another related frequency such as the frequency which is a harmonic thereof or otherwise related thereto.

FIG. 3 illustrates an active electronic device 50A which may be located within a room, adjacent to or within the frame of a door or wall, a floor, roadway, post, curbing or other device and which includes a voltage controlled oscillator 51, the signals of which are transmitted by short wave by means of an antenna 52 connected to the oscillator. A portable device 61 may comprise a chip, printed circuit card or otherwise formed electronic circuit containing an antenna 63 for receiving the signals generated by oscillator 51 and radiated by its antenna 52. The signal received by antenna 63 is passed to a tuned varactor triple frequency multiplier circuit which includes a varactor 62, and emerges at a transmitting antenna 64 as a signal having three times the input frequency which output signal is rebroadcast on antenna 64.

Electronic device 50A includes a receiving antenna 54 which receives the rebroadcast signal transmitted from antenna 64 and passes such received signal to a voltage controlled receiver 53 which is responsive to the presence of this input by providing an enabling signal to enable the operation of a code comparator 56. Such enabling signal is transmitted on the output 53A of the voltage controlled receiver 53 and may close, for example, a normally open switch connected between a power supply denoted P.S. and the code comparator 56.

Both the transmitter frequency and the receiver frequency are voltage controlled simultaneously so as to keep them in proper frequency relationship with each other, by a staircase generator 55. The staircase generator 55 also provides a coded output corresponding to its present step in waveform (or the transmitted and received frequency thereof) to the code comparator 56.

A memory device 57, such as an electronic circuit or series of circuits constructed or containing electronic memory means for generating one or more parallel codes on its parallel outputs 57A is employed to define the codes which are authorized to effect the activation or deactivation of an alarm when the code comparator 56 receives a parallel code generated on the parallel outputs 55A of the staircase generator 55. When the codes presented on the circuits 57A and 55A are matched or compared in the code comparator 56 to define coincidence detection thereof, the output 56A of the comparator 56 becomes energized and such energization may be employed to enable or disable the operation of an alarm or alarm control circuit 58. Circuit 58, for example, may comprise a normally closed switch which, upon receipt of a signal from comparator 56 on its switching input 58A, is caused to open and thereby prevent the signal generated by a proximity detector from activating an alarm 59 when the presence of an article, person or vehicle at the check point is sensed by the proximity detector 60.

If the portable device 61 is held or contained by a device held by a person removing an article, and the device 60 is employed to detect the movement of the article, then the electronic circuits comprising device 58 may be so constructed as to prevent the activation of alarm 59 when circuit 60 effects such detection and device 61 is present. If device 61 is attached to the article, person or vehicle for the purpose of indicating movement past the check point or detection location, the activation of circuit 56A by the presence of device 61 and proximity detector 60 may be employed to cause the alarm 59 to become activated. Device 58 may thus comprise one or more AND logical circuits which, when proximity detector 60 and input 56 are simultaneously present at 58, will generated an output signal on the output 58A of device 58 for operating or enabling the operation of alarm 59.

Although not illustrated in the drawings, the systems described may be supplemented by additional security devices and subsystem as follows:

I. The alarm devices provided may be located at either or both locations which are in the vicinity of the checkpoint where detection of the unauthorized object or person is made and remote therefrom such as at a central monitor station. A closed circuit television system may be employed to permit a person or persons at such a central or remote monitor station to view the objects or persons passing the checkpoint and to particularly study or record image signals of objects and or persons moving same past the checkpoint when the described alarm deactivation coded card or electronic device is not carried by the person or device past the check point. The alarm or activating circuit therefore may also be connected to turn on or energize the closed circuit television system when it becomes energized, activate a video-tape recorder to operate in recording the output of a television camera located at the checkpoint and scanning the device or person to permit it to record image signals derived from the camera of the person or object so detected. The television camera may also be similarly activated or energized by the same signal employed to activate the alarm as may be a photographic camera for photographing pictures of the person or object detected.

II. The signal activating the alarm circuits described herein, may also be employed to activate one or more additional devices such as an automatic record play and speaker operable to playback a message from storage at the checkpoint, a gate or door closing device or motor closing same, a device adapted to prevent the opening of a door or gate, or any other type of restraining device designed to prevent movement of the object or person out of a room or buildiong or past the checkpoint when so activated.

III. In yet another form of the invention, it is noted that an article may carry, contain or have hidden therein or thereon a coded electronic circuit such as one of those denoted 13,42 or 61 provided respectively in FIGS. 1,2 and 3 which may generate a code signal or otherwise activate a detector as described above and thereby activate an alarm, as described, which alarm may be deactivated when movement of the object containing such circuit and the circuit as detected wherein such deactivation is effected by a second electronic circuit carried by the person carrying or transporting the object past the check point. Such second electronic circuit may be similar to structure and operation to the circuit carried by the object and may be formed as described on a card or chip forming part of a watch, button or other device attached to or carried in the pocket of the person carrying the object and operable, as described and illustrated in the drawings to so deactivate the alarm which would be activated when the coded card or chip supported by the object comes within the range of the described antenna. For example, in FIG. 1 the signals generated on the outputs 24A of the receiver 24 when the object held circuit is within range of the receiver may be such as to generate an alarm activating signal on the output 25A of comparator 25 when no such second electronic circuit (e.g. circuit 13) is within range of receiver antenna 24 to alter or change the code signals generated on the outputs 24A of the receiver in such a manner as to prevent code matching in comparator 25 with the memory code signals generated by memory 26 and thereby prevent a signal from being generated on output 25A of comparator. In FIG. 2 while the chip or card carried by the object to be protected against theft may contain an electronic circuit which will cause the staircase generator, when received on antenna 32, to generate a code on ouputs 33A which code will suitably activate the code aomparator to generate a signal on its output 35A for activating an alarm. The presence of a second electronic circuit such as a code or chip containing circuit similar to that contained on device 42 carried by the person or a vehicle carrying the object past the checkpoint may serve to change the signals generated on outputs 33A to prevent activation of the output 35A of the code comparator 35 or may be employed to generate a code as described which is picked up by another receiver applied to another code comparator similar to devices 25 or 35 for generating a disabling output signal when the card or chip contained code generator is activated wherein such disabling signal may be applied to open a normally closed/monostable switch in the output 35A to prevent the signal generated by the comparator on 35A from being passed to activate the alarm 40.

IV. In yet another form of the invention, the detection systems of FIGS. 1 to 3 may be employed to indicate to a person carrying luggage or to the driver of a truck or other conveyance when a piece of luggage or other article is being removed from his vicinity or vehicle. If one of the described signal detection and alarm electronic systems is carried by a person with objects such as luggage or the driver of a truck or vehicle or is supported by or within the vehicle and the described deactivating circuit containing card or chip is supported by or hidden on the article or luggage to be protected, the removal of said object or luggage from the vehicle or the vicinity of the person will be indicated by the operation of the alarm when the deactivating circuit is out of range of the receiver and electronics connected thereto.

Additional forms of the invention include the following:

(a) The short wave responsive code generating device of FIG. 1 may be employed as a credit card per se or as a combined credit card and lock opening or electronic circuit completing means as described. When employed as a credit card, it may be disposed adjacent to or within a card reader which reader includes means for generating short wave radiation to be picked up by the receiver of the card, converted to electrical energy and employed to energize the code or tone generating circuits and the transmitter of the card. The code signals so generated are received by a receiver in or associated with the reader and are compared in suitable comparator electronic circuitry associated with the reader, with signals generated in one or more manners, such as:

(1) Signals generated when the card holder speaks selected words into a microphone, the signals generated by which microphone are analyzed by suitable speech and/or phonome analyzing circuits;

(2) Signals generated by scanning means for physical features of the card holder such as his finger print, hand, facial features, etc.;

(3) Signals generated by another auxiliary device held by the person presenting the card to the reader such as a second card or other device containing electronic circuitry similar to that contained in the credit card presented to the reader. Such other devices may include a flexible similar circuit means contained within the clothing, a flexible or rigid similar circuit means contained within a belt buckle, finger ring, shoe or other device worn or carried by the person or a microminiature circuit device held against or implanted under the skin.

(4) The code signals generated by the other device are preferably transmitted by short wave at a frequency other than the frequency of the code generated by the circuits of the credit card so that the two codes can be discriminated from each other.

(5) The codes generated by the electronic circuit of the credit card and the auxiliary device carried by the person presenting the card, may be combined to form a single series code or parallel codes to be compared with a code reproduced from a memory in the reader or a computer memory connected to the reader.

(6) In addition to enabling the operation of a machine or motor vehicle and the opening of a door lock as described, the code generating means as described above may be employed for billing and other purposes including:

Automatic identification of a motor vehicle or owner thereof for billing or security purposes, wherein short wave radiation at a checkpoint, such as a toll booth, pole or traffic light housing, is generated and is employed to energize a code generating device of the type described which is located on a vehicle, such as on its bumper or on its license plate. The same code generator may be hidden or integral with the bumper and used to identify the vehicle at check points along the road defined by transmitter-receiver means in the road or adjacent the road.

(7) Identification by a vehicle of locations along its route of travel when the vehicle generates short wave energy and circuit means, as described, located in the roadway, curbing or poles at the side of the road becomes energized by means of such energy and transmits a code which is picked by a receiver on the vehicle, decoded and compared with the recorded codes, may be employed to automatically define the geographical location of the vehicle for control or display energizing purposes.

In FIG. 4 is shown a modified form of the invention wherein electrical switching means is enabled to permit the operation of a machine, such as a motor vehicle, when a suitable portable coded electronic device, such as the card or chip bearing devices denoted 13, 42 and 61 of FIGS. 1, 2 and 3, is present in the vicinity of the machine being operated or a control means therefore. The electronic control system 62B illustrated in FIG. 4 employs components which are present in system 10 of FIG. 1 although it is noted that similar functioning components of other control systems such as those illustrated in FIGS. 2 and 3 or the like, may also be employed in FIG. 4.

Notation 63B refers to a source of electrical energy, such as a conventional motor vehicle battery, which is shown connected to the ignition switch 65 of the vehicle which is operable by means of a key 64B of the conventional type. When the key 64 is inserted into the receptacle of the housing of switch 65 and turned, it closes two sets of contacts denoted respectively 67, 68 and 69, 70. Contacts 67, 68 connect the output of battery 63B to the input of a first normally open switch 72, the output of which, when the switch is closed, connects battery 63B to the starting motor 73 of the motor vehicle. The ignition switch 65 is of the conventional type wherein, when the key 64B is turned by hand to its maximum turning position, both sets of contacts will close permitting the starting motor to operate when switch 72 is closed and the ignition system 75 to receive electrical energy when switch 74 is closed. When turning force is released from the key 64B, the switch contact support 66 is spring loaded to open contacts 67 and 68 but retains contacts 69 and 70 closed until the key is turned further by hand.

The output of contact 70 extends to energize a logical AND circuit 71 and also to one switching input thereof as shown. Contact 70 is also connected to energize the described field signal generator 11, shortwave receiver 24 and code comparator 25. The signal generator 11 and other circuits connected to battery 63B through switch 65 are all preferably supported within a single housing which may be secured to or behind the dashboard of the motor vehicle and preferably opposite of the driver of the vehicle so that the shortwave energy field generated by generator 11 will provide suitable energy for energizing the electronic circuits of the portable device 13 may comprise a circuit board, card or chip carried by the driver of the vehicle as described. If the portable device 13 is present and the shortwave code signals generated thereby are received by antenna 19 and receiver 24, the memory 25M of comparator 25 is such that a control signal will be generated on the output of the comparator upon detecting the code signals generated by device 13 and such control signal may be applied to the other switching input of the AND circuit 71 providing an output which is applied to close the two normally open switches 72 and 74 permitting energy from battery 63B to be passed to the starting motor 73 and the ignition system 75 of the motor vehicle. The output of the magneto or alternator 76 which is driven by the engine of the motor vehicle is also shown extending to the input of normally open switch 74 so that electrical energy generated by the magneto 76 may be applied to energize the ignition system 75.

Also shown in FIG. 4 is an alarm 79 which may comprise a bell, buzzer, siren or the horn of the motor vehicle, which is energized if a normally closed switch 78 within connects the alarm input to the battery 63B through the ignition switch 65 is not opened by the input of AND circuit 71, an indication that a person is attempting to start the motor vehicle or machine without holding or carrying the portable code generating device 13. A time delay relay 77 is provided in the circuit extending between contact 68 and the input to normally closed switch 78 to account for the time it takes for switching to occur through AND circuit 71 to prevent activation of the alarm 79 before normally closed switch 78 is opened by the signal generated on the output of the AND circuit 71. Alarm 79 may be of a type which remains activated once it is pulsed until it is remotely or locally deactivated by any suitable means. A deactivating input 80 for the alarm 79 is shown connected to the output of AND circuit 71 so that if the coded portable device 13 is brought into the vicinity of the field generated by field generator 11 after the alarm has been activated, it may be employed to deactivate or turn off the alarm.

Also shown in FIG. 4 is a code generator 81 connected to the output of the normally closed switch 78 which operates to generate a code and transmit same by shortwave on antenna 82 to a remote alarm or monitor station which may contain means for indicating, not only the fact that an unauthorized attempt is being made to start the motor vehicle but also the identity of the motor vehicle and possibly its location if the latter is known to the person at the monitor station.

In variations of the system illustrated in FIG. 4, it is noted that deactivation of the alarm 79 may also be effected when the key 64B is removed from the ignition switch by suitable wiring therewith and, if necessary, by means of suitable logical electrical circuitry connected and operable to perform such function. Also, a time delay relay may be employed to deactivate the alarm within a set period of time after it becomes activated to deter theft.

It is also noted that the system 62B illustrated in FIG. 4 or modifications thereof may be employed to permit the operation of machinery other than motor vehicles such as machine tools and the like or to enable the opening of a door by enabling and effecting the operation of an electrically operated lock upon the insertion and/or turning of a key in the key receptacle thereof in the presence of an enabling electrical shortwave generating circuit such as that provided by means of portable device 13.

Similar components to those illustrated in FIG. 1 may be derived from the systems illustrated in FIGS. 2 and 3 to operate the system of FIG. 4 by the requisite modofications thereto and it is noted that the portable electronic signal generating or modifying circuits may also be provided supported by finger rings, wrist watches, buttons or other means carried by the authorized driver of the motor vehicle or operator of the machine to be so controlled.

Additional forms of the invention include the following:

(a) The shortwave responsive code generating devices 13, 42, 61 of FIGS. 1-3 may be employed as a credit card per se or as a combined credit card and circuit for attaining the opening of a lock or the closure of a switch as described. When employed as a credit card, it may be disposed adjacent to or within a card reader which reader includes means for generating shortwave radiation to be picked up by the receiver of the card, converted to electrical energy and employed to energize the code or tone generating circuits and transmitter of the card. The code signals so generated are received by a receiver in or associated with the reader and are compared in suitable comparator circuitry associated with the reader, with signals generated in one or more manners such as:

(a) signals generated when the card holder speaks selected words into a microphone, the signals of which speech are analyzed by suitable speech and/or phoneme analyzing circuits;

(b) signals generated by scanning means for physical features of the card holder, such as his fingerprint, hand, facial features, etc.

(c) signals generated by another auxiliary device held by the person presenting the card to the reader such as a second card or other device containing electronic circuitry similar to that contained in the credit card presented to the reader. Such other devices may include a flexible similar circuit means contained with the clothing, a flexible or rigid similar circuit means contained within a belt buckle, the belt itself, finger rings, shoe or other device worn or carried by the person or perhaps even a microminiature circuit device implanted under the skin.

With respect to all of the embodiments of the invention which are described herein including those illustrated in the accompanying drawings, it should be understood that, where not shown, power supplies are provided having correct polarities and magnitudes for supplying proper electrical energy for appropriately operating the various electrical circuits as described in the specification.

I claim:

1. An automatically controlled switching system comprising:
   (a) first means for generating short wave radiation,
   (b) means for transmitting said short wave radiation as an energy field in the vicinity of said first means,
   (c) second means including a portable circuit means for receiving said short wave radiation and
   (d) third means for generating a control signal when said second means is within a given short range of said transmitting means,
   (e) first switch means having a control input from said third means for receiving said control signal,
   (f) said first switch means having a control input from said third means for receiving said control signal, said first switch means adapted to become activated upon receipt of said control signal,
   (g) second switch means,
   (h) key operated means for activating said second switch means to close,
   (i) a power supply connected to said second switch means, and
   (j) an output circuit connected to receive electrical energy from said power supply when said first switch means is activated by said control signal from said third means and said second switch means is closed by said key operated means.

2. A system in accordance with claim 1, including an electric motor,
said output circuit being connected to the power supply for operating the electric motor.

3. A system in accordance with claim 2, wherein said key operated means is an ignition switch for a motor vehicle for connecting said power supply to the starting motor for the motor vehicle when said output circuit is energized with electrical energy from said power supply.

4. A system in accordance with claim 1, including an alarm operable to be activated when said second switch means is closed and said portable circuit means is not within said given short range of said transmitting means.

5. A system in accordance with claim 1, including code signal generating means and comparator means connected to receive a code signal generated by said code signal generating means and said control signal from said third means,
said comparator means being connected to close said first switch means when the signals generated by said code signal generating means and said control signal from said third means attain coincidence matching in said comparator means.

6. A system in accordance with claim 1, wherein said portable circuit means includes a substrate and microminiature circuit mean supported by said substrate wherein said portable circuit means is adapted to be carried by a person seeking to connect said power supply to said output circuit.

7. A system in accordance with claim 2, wherein said electric motor is supported by a motor vehicle for operating same.

8. A system in accordance with claim 7, wherein said electric motor is a starting motor of said motor vehicle.

9. A system in accordance with claim 3, including switching means for maintaining said power supply connected to said electric motor after said first switch means is closed and when said key operated means closes said second switch means.

10. A system in accordance with claim 1, wherein said control signal varies in accordance with variations in said short wave radiation received by said third means and
said second means is a coded array of electrical circuit elements operable when said second means is within a given range of said first means to absorb energy from said energy field, and
detection means for detecting the variation in the energy field caused by the energy absorbed by said second means,
said detection means being operable to control the generation of said control signal when it detects the reduction in said energy field resulting from absorption of energy by said second means.

11. A system in accordance with claim 10, wherein said second means is a coded array of inductors forming said portable circuit means and operable to absorb part of the short wave radiation generated by said first means.

12. A system in accordance with claim 11, wherein said coded array of inductors are formed on a thin flat substrate.

13. A system in accordance with claim 12, wherein said thin flat substrate is a card adapted to be carried by a person and defines a key for use in activating said second switch means to close when it is applied to said key operated means.

14. A system in accordance with claim 11, wherein said coded array of inductors are formed on a flat substrate, and also having a key for operating said key operated means to cause said second switch means to close.

15. An electronic detection system comprising:

(a) a first means for generating a radiant energy field, (b) second means including a portable coded circuit movable into said radiant energy field and operable for selectively absorbing energy from said field, (c) third means for generating a control signal when said portable coded circuit is absorbing energy within a given range of said first means, (d) fourth means for receiving said control signal, and (e) control switch means having a control input for receiving said control signal from said fourth means to activate said control switch means upon receipt of said control signal, (f) an additional switch in circuit with said control switch means for completing a circuit with said power supply and said output circuit when both said additional switch and said control switch means are activated (g) a power supply connected to said control switch means, and (h) an output circuit connected to receive electrical energy from said power supply when said control switch means is activated by said electrical control signal.

16. An automatically controlled switching system comprising:

(a) first means for generating short wave radiation, (b) means for transmitting said short wave radiation as a radiant energy field of substantially constant field strength in the vicinity of said first means, (c) second means including a portable electrical circuit movable into said radiant energy field, which, when it intersects said radiant energy field and is within a given short range of said short wave radiation transmitting means, effects the generation of a signal, (d) third means for receiving and converting said signal to an electrical control signal, (e) first switch means having a control input from said third means and connected to receive said electrical control signal and to become activated upon receipt of said signal, (f) second switch means, (g) key operated means for activating said second switch means to close, (h) a power supply connected to said second switch means, and (i) an output circuit connected to receive electrical energy from said power supply when said first switch means is activated by said electrical control signal generated by said third means and said second switch means is closed by the operation of said key operated means.

* * * * *